Patented Dec. 19, 1944

2,365,479

UNITED STATES PATENT OFFICE 2,365,479

DISPERSIBLE COMPOSITIONS

Joseph W. Lang, Woodstown, N. J., assignor to E. I. du Pont de Nemours & Company, Wilmington, Del., a corporation of Delaware No Drawing. Application August 1, 1940,
Serial No. 349,301

16 Claims. (Cl. 106—308)

This invention relates to new processes for making dispersible compositions which comprise subdivided water-insoluble substances, and to improved compositions made by the new processes.

It is among the objects of the invention to improve the dispersion characteristics of subdivided water-insoluble organic or inorganic solids. A special object of the invention is to provide for improvements in the strength and brightness of pigmentation in compositions which are pigmented with dispersed pigment powders. Another object of the invention is to provide for improvements in the preservation characteristics of aqueous slurries or pastes containing subdivided solids which may be obtained in the form of a water slurry or paste by precipitation from a dilute medium or by incorporating water into a dry powdery composition containing the solids. Another object of the invention is to provide improved means for concentrating aqueous dispersions of subdivided solids. Still other objects of the invention will be apparent from the following description.

The objects of the invention are attained in general by suspending the particles in a suitable medium, coating the particles of the solids with a water-soluble form of a precipitable protective agent and precipitating the protective agent on the particles. The suspending medium may be removed from the particles which are coated with the protective agent to the extent that a paste is produced or to the extent that a dry powder is produced. When in the dry or moist form, agents which are capable of solubilizing the protective agents can be added.

The term, "protective agent" as used in the specification and claims, is defined as a material which in the form of its inorganic salt functions to produce a thin coating or film of protective colloid on the solid particles in an aqueous alkaline solution and is precipitated on the particles as the protective agent upon acidification, yielding a film thereof coated on the dispersed particles.

The invention will be more fully set forth in the following more detailed description which includes examples that are given as illustrative embodiments of the invention and not as limitations thereof. Parts are expressed in parts by weight unless otherwise noted.

Example I 152 parts of m-nitro-p-toluidine were slurried with 500 parts of water containing 82 parts of 100% hydrochloric acid and diazotized in the usual way with 69 parts of sodium nitrite at 5° C.

A solution of rosin size was prepared by dissolving 420 parts of wood rosin in 1500 parts of water and 67 parts of caustic soda at 95° C.

177 parts of acetoacetanilide were slurried in 2000 parts of water and 105 parts of sodium bicarbonate. The rosin solution was added to this slurry and the temperature was adjusted to 25° C. The solution of diazotized m-nitro-p-toluidine was then slowly added over a period of about 20 minutes. Upon completion of the coupling, the color slurry was acidified to precipitate the rosin by adding 61 parts of 100% hydrochloric acid and the solids were separated by filtration. The press cake was then washed essentially free from electrolyte whereupon it was slurried with 128 parts of caustic soda which lowered the viscosity of the press cake and converted the rosin acids to their sodium salts. The mixture was then dried at 60° C. and ground. A yield of 840 lbs. of product was obtained which contained approximately 40% of a yellow pigment.

The dry powder dispersed readily in water and when tested in paper beater dyeings gave much stronger colors than a press cake of the same yellow color when prepared without the addition of sodium rosinate as described.

If desired, other wetting or dispersing agents such as naphthalene sulfonic acids, sulfonated alcohols or Turkey red oil may be added to the composition prior to drying, or such additional agents may be ground with the dry product to aid in wetting or preventing lumping when it is mixed with water.

Example II

Another composition was made by the same process as that described in Example I except that one-fourth of the sodium rosinate solution was added to the acetoacetanilide slurry and the remainder was added after coupling and before acidifying with the hydrochloric acid to precipitate the rosin. The yield, quality and properties of the product were the same except that the yellow pigment was much greener and brighter in shade. This product is highly desirable for blending with the product obtained as described in Example I to produce a product of intermediate shade and to aid in standardization.

Example III

The diazo prepared as in Example I was coupled with acetoacetanilide prepared as follows:

177 parts of acetoacetanilide were slurried in 3000 parts of water and 204 parts of sodium acetate. Upon completion of the coupling, the slurry was made slightly alkaline with caustic soda, 50 parts being required. The sodium rosinate solution was prepared as described in Example I and added. After stirring for 15 minutes the color slurry was made acid to precipitate the rosin, and then isolated, washed, re-slurried with caustic soda and finished as described in Example I. The product was similar in dispersion characteristics to the yellow product obtained in Example II, but was greener and brighter in shade although slightly weaker in tinting strength.

Example IV

A precipitated rosin and color press cake composition which was isolated as described in Example I was washed thoroughly to remove the last traces of electrolytes and dried. The ground dried product was readily soluble in alcohol, turpentine, and other organic solvents for rosin. In such a medium the yellow color was very finely divided and dispersed throughout the solution. Such a product is especially desirable for the manufacture of paints and enamels as good color dispersions are obtainable without the necessity of grinding the dry color into the vehicle. Other resins and gums which are useful for the preparation of paints and enamels and which are soluble in alkaline solutions may be used instead of the wood rosin specified in Example I.

Example V

The diazonium compound prepared from m-nitro-p-toluidine as described in Example I was coupled with beta naphthol in the following manner:

150 parts of beta naphthol were dissolved in 500 parts of water and 40 parts of caustic soda at 25° C. A solution made by dissolving 420 parts of wood rosin in a solution composed of 1600 parts of water and 68 parts of caustic soda was added to the solution of beta naphthol and then 230 parts of sodium bicarbonate were added. The temperature was adjusted to 20° C. and the diazo solution was slowly added to the beta naphthol solution over a period of 20 minutes. When coupling was complete the color slurry was made acid to blue litmus paper by slowly adding 500 parts of 10 normal hydrochloric acid. The precipitated mixture of color and rosin was filtered and washed essentially free of electrolyte.

The press cake was a red powder equivalent to approximately 700 parts of dry material. A portion of the press cake was dried and tested for dispersion. It was similarly readily dispersible in inorganic solvents in which rosin is soluble as described in Example IV.

One-half of the press cake was stirred with a solution containing 50 parts of caustic soda and 150 parts of water until a smooth slurry was obtained. This composition was then dried and ground to sizes which passed a 60 mesh screen. The product was a free-flowing red powder which was readily dispersible in water to a very fine state of subdivision. The red product was found to be particularly desirable for making paper beater dyeings, paper coatings and the preparation of lakes because of its superior strength.

Example VI

The diazonium compound prepared from m-nitro-p-toluidine as described in Example I was coupled with acetoacetanilide in the presence of solubilized casein as follows: 180 parts of acetoacetanilide were slurried in a solution consisting of 2000 parts of water and 252 parts of sodium bicarbonate. A solution consisting of 300 parts of casein dissolved in a solution composed of 2000 parts of water and 12 parts of caustic soda was added to the slurry. The temperature was adjusted to 25° C. and the diazo solution was slowly added to the solution containing the coupling component. When coupling was complete, acetic acid was added to the slurry until the pH value of the slurry was approximately 5. The slurry was then diluted to 1100 parts with water. The casein was thus coagulated and the slurry was then filtered. The press cake was washed free of electrolyte and dried. The dried cake was ground to pass a 100 mesh screen and 24 parts of powdered dry crystals of trisodium phosphate were added and mixed thoroughly with the ground color. A yield of 624 parts of product was obtained which contained approximately 50% of coloring matter. The product was found to be especially valuable for coloring cold water paints in shades of yellow. The new product was about twice as strong on an equal color basis as the same pigment made in the customary way without the use of casein, and it was found to be greener and brighter in shade.

Example VII

A copper phthalocyanine pigment paste containing 20 parts of the pigment was prepared according to Example III of BP 410,814. The damp press cake was slurried in 300 parts of water. A solution made by dissolving 30 parts of wood rosin in 150 parts of water and 6 parts of caustic soda was added to the slurry and the mixture was stirred for approximately 1 hour. The rosin was precipitated by acidifying with 4.6 parts of hydrochloric acid. The mass was then filtered and washed free of electrolyte. The press cake which contains approximately 115 parts of water was then slurried with a 30% caustic soda solution containing 7.2 parts caustic soda and dried. The product consisting of 57 parts contained approximately 35% of coloring matter. Upon grinding to pass an 80 mesh screen, a free-flowing blue powder was obtained which was readily dispersible in water to a fine state of subdivision. When the product was wet with water, a blue pigment paste equivalent in tinctorial strength to the original aqueous paste was produced. The dry product is superior to an aqueous paste in that it is a stable powder which is more readily standardized, is more convenient to ship, and is more convenient to use than the aqueous paste.

Although the press cake of this color, when slurried with the sodium rosinate solution can be dried directly to yield a product similar in properties to that obtained by precipitating the rosin and re-saponifying with caustic soda before drying, it is advantageous to precipitate the rosin on the pigment, re-slurry with caustic and then dry. The latter method effects a concentration of the solids in the form of a viscous paste. This concentration of solids is of great importance in the drying of materials containing rosin size. Unless the composition is in the form of a viscous paste which cracks upon drying, the composition dries very slowly.

Example VIII

A dry powder composed of 20 parts of 4-amino-4'-(ethyl hydroxy ethylamino) azo benzene was prepared as described in Example I of U. S. P. 2,172,752. This dry powder is not readily dispersed in water. The dry powder was dissolved in 400 parts of water containing 5.2 parts of hydrochloric acid. The solution was then run into a solution of sodium rosinate which was prepared by dissolving 30 parts of rosin in 400 parts of water containing 8 parts of caustic soda. After stirring for 1 hour, the slurry was neutralized with 1.8 parts of hydrochloric acid, filtered, and washed free of electrolyte. The press cake was then slurried with 7.2 parts of caustic soda and dried. A yield of 57 parts of the dried mixture was obtained which can be ground to a free flowing powder which was found to be readily dispersible in water. The product dyes acetate silk in bright shades of black when developed on the fiber with 2-hydroxy-naphthalene-3-carboxylic acid in the usual manner.

*Example IX*

A wet press cake containing 20 parts of the vat dye identified as No. 1106 in the Color Index was used instead of the 20 parts of copper phthalocyanine in the procedure of Example VII. The yield was 57 parts of a dry free flowing blue powder which contained 35% of the coloring matter. The product dispersed well in water and was readily converted to the leuco form for dyeing textile materials by the usual methods employed for vat dyes.

*Example X*

7.2 parts of alpha naphthylamine were diazotized in the usual manner. Coupling was made by slowly adding the diazo solution to a solution containing 13 parts of 1-hydroxy-naphthalene-5-sulfonic acid and sodium rosinate which was prepared as follows: 20 parts of B wood rosin were dissolved in a solution consisting of 200 parts of water and 4 parts of caustic soda with boiling. Then the 1-hydroxy-naphthalene-5-sulfonic acid, 13.3 parts of soda ash and 3.5 parts of sodium bicarbonate were dissolved in the solution. This solution was cooled to 0° C. and the coupling was made by adding the diazo solution over a period of 20 minutes. Upon completion of the coupling, the slurry was made acid to blue litmus by adding 11 parts of hydrochloric acid and filtered. The press cake was washed practically free of electrolyte and then mixed with 6 parts of caustic soda and dried. The resulting dry powder was obtained in yield of 45 parts of which approximately 45% was color. After grinding the dry cake to pass an 80 mesh screen, the composition was readily dispersible in water and suitable for making paper beater dyeings, paper coatings, and for the preparation of lakes. It gave colors in deep red or maroon shades.

The soda salt of this color is quite insoluble and is sometimes used as a pigment without conversion to an alkaline earth salt. Because of its insolubility and lack of dispersibility the soda salt has heretofore been used only in paste form for aqueous dispersions as it becomes very hard on drying, and in the dry form it is not suitable for use in dispersions. This invention provides the color as a stable dry powder which is as readily dispersed in water as the paste form of the color.

In general the processes of the invention are useful for making dispersible subdivided compositions of any type of insoluble substance, either organic or inorganic which is stable to the mild alkaline and acid treatments which are employed in the processes. Such dispersible sub-divided solids are useful extensively as components of various aqueous and non-aqueous fluid and semi-fluid compositions, such as insecticides, sprays, dyebaths containing insoluble dyestuffs for dyeing fabrics and for making pigmenting compositions containing pigment powders.

Many minor variations in the processes which will readily suggest themselves to those skilled in the art can be made to suit special circumstances and special characteristics of the materials to be treated. For example, in some cases it is advantageous to precipitate the insoluble subdivided solids in the presence of the solubilized protective agent and in other cases better results may be obtained by adding the solubilized protective agent to a suspension which is prepared from the pre-formed subdivided solids.

The final products may be made in the form of pastes or in the form of dry solids. Such products may or may not contain an alkaline solubilizing agent to convert the protective agent to its solubilized form. For example, when wood rosin or its equivalent is used as the protective agent the product may be made in the form of a hydrous paste or in the dry form without adding the alkaline solubilizing agent. In the dry form, these products are dispersible in organic vehicles but not in aqueous vehicles. When an alkaline solibilizing agent is present in the paste or in the dry form of these products, they are dispersible in aqueous vehicles but not in organic vehicles. If casein or its equivalent is used as the protective agent the products are not dispersible in aqueous or organic vehicles unless the alkaline solubilizing material is added, but when the products are prepared without the solubilizing agents, they become dispersible in water media when such a solubilizing agent is added.

The most desirable ratio of pigment to protective agent will vary with different solids. In general, however, the optimum is that which produces good dispersion and good drying properties when a paste is formed, but considerable variation from the optimum can be made. Excessive amounts of protective agent sometimes cause poor dispersibility and a deficiency of the precipitable protective agent may cause poor drying qualities in a paste. The optimum ratio of pigment to precipitable protective agent is about 1 part of solids and from about 1 to about 6 parts of protective agent. In general, as low as 0.1 and as high as 9 parts of protective agent can be used satisfactorily. However, when a non-precipitable protective agent is added, a deficiency of precipitable protective agent can be used.

Application of the new processes to suspensions of finely divided solids has the effect of preserving the solid particles in non-adherent form when the solids are brought into more concentrated form, such as a paste. The same result is found even in those forms where the suspending medium has been removed, such as dried pastes and more or less finely divided aggregates of the dried pastes. The exact manner of operation of the precipitable protective colloids is not understood but it is my present belief that the suspended particles become coated with a film of the soluble form of the protective colloids, and the coatings on the particles are preserved as unbroken films of the protective colloid upon acidification and removal of all or the major part of the suspending medium. In the form of pastes or solids containing alkaline agents which form soluble salts of the protective colloids, the particles are still preserved in their original non-adherent forms and in condition to form suspensions of non-aggregated particles whenever a suspending medium is added. However, the invention is not limited by the suggested theory.

Any precipitable protective colloid can be used instead of rosin or casein. As a few illustrations of the many protective colloids which produce the results of the invention are mentioned oxidized rosin, arylated rosin, chlorinated rosin, nitro rosins, abietene sulfonic acid, hydrogenated rosin, the naphthenic acids, Gambage, Liquid Styrax, Gualacum, Mastic, Myrrh, Benzoin Gum, Ammoniucam, Galbanum and amino acids, such as soy bean protein. Any solubilizing agent which forms salts with acids and restores the protective agent upon acidification can be used instead of caustic soda or trisodium phosphate, as illustrations of which are the inorganic solubilizing agents, such as sodium carbonate, potassium carbonate, potassium hydroxide, other alkali-metal phosphates, calcium hydroxide, borax and other alkaline reacting salts or the organic solubilizers such as triethanolamine.

The new processes provide improved, convenient and economical means of preparing finely divided readily dispersible particles in concentrated forms which can be conveniently handled in storage or shipment. The invention presents distinct advantages over the costly grinding and viscous milling operations heretofore applied to pastes and solids which are necessary to break down strongly adherent aggregations of particles formed during the concentration or drying. Such ground particles can rarely, if ever, be reconverted into dispersions which are equivalent to the original suspensions. Still another advantage of the invention resides in that dry products are provided which may be re-dispersed directly either into aqueous or into oleagenous and organic vehicles.

From the foregoing disclosure it will be recognized that the invention is susceptible of modification without departing from the spirit and scope thereof and it is to be understood that the invention is not restricted to the specific illustrations thereof herein set forth.

I claim:

1. The process which comprises suspending particles of an insoluble solid in aqueous medium in the presence of an aqueous solution of a water-soluble salt of a water-insoluble protective agent which is capable of being converted to the protective agent by the action of an acid and in excess of that which adheres as films to such particles when they are suspended in aqueous medium, said protective agent being reconvertible into a dispersion agent in quantity in excess of that which the pigment is capable of adsorbing, acidifying the mixture to convert the adherent water-soluble salt to films of the protective agent on said particles, and removing the suspending medium and dissolved electrolytes until a non-suspended composition is formed, said protective agent being present in the proportion of about 0.1 part to about 9 parts per part of said particles.

2. The process of preparing dispersible water-insoluble particles of a solid which comprises suspending the particles in aqueous medium in the presence of an aqueous solution of a water-soluble salt of a water-insoluble protective agent which is capable of being converted to the protective agent by the action of an acid and in excess of that which adheres as a film to such particles in aqueous medium, said protective agent being reconvertible into a dispersion agent in quantity in excess of that which the pigment is capable of adsorbing, acidifying the mixture to convert the adherent water-soluble salt to a film of the protective agent, removing the major part of the aqueous medium and dissolved electrolytes, and then adding to the aggregated particles at least sufficient of a salt-forming compound to form a soluble salt of the adherent protective agent, said protective agent being present in the proportion of about 0.1 part to about 9 parts per part of said particles.

3. The process of preparing dispersible water-insoluble particles of a solid which comprises mixing a suspension of the particles in aqueous medium with a water-soluble salt of a water-insoluble protective agent which is capable of being converted to the protective agent by the action of an acid and in excess of that which adheres as a film to such particles in aqueous medium, said protective agent being reconvertible into a dispersion agent in quantity in excess of that which the pigment is capable of absorbing, acidifying the mixture to convert the adherent water-soluble salt to a film of the protective agent, removing the major part of the aqueous medium and dissolved electrolytes, moistening the product thus produced with a solution containing sufficient of a salt-forming compound to form a soluble salt of the protective agent, and then drying, said protective agent being present in the proportion of about 0.1 part to about 9 parts per part of said particles.

4. The process of preparing dispersible water-insoluble particles of a solid which comprises mixing a suspension of the particles in aqueous medium with a water-soluble salt of a water-insoluble protective agent which is capable of being converted to the protective agent by the action of an acid and in excess of that which adheres as a film to such particles in aqueous medium, acidifying the mixture to convert the adherent water-soluble salt to the protective agent, removing the major part of the aqueous medium and dissolved electrolytes, drying the product thus produced, mixing said product with sufficient of a dry salt-forming compound to convert the protective agent into a water-soluble salt, and then grinding the mixture to a powder, said protective agent being present in the proportion of about 0.1 part to about 9 parts per part of said particles.

5. The process which comprises mixing into an aqueous suspension of particles of a water-insoluble organic pigment a water-soluble salt of a water-insoluble protective agent which is capable of being converted to the protective agent by the action of an acid and in excess of that which adheres as films to such particles when they are suspended in aqueous medium, said protective agent being reconvertible into a dispersion agent in quantity in excess of that which the pigment is capable of adsorbing, acidifying the mixture to convert the adherent water-soluble salt to films of the protective agent on said particles, and removing the suspending medium and dissolved electrolytes until a non-suspended composition is formed, said protective agent being present in the proportion of about 0.1 part to about 9 parts per part of said particles.

6. The process of preparing dispersible particles of water-insoluble organic pigments which comprises mixing a suspension of the particles in aqueous medium with a water-soluble salt of a water-insoluble protective agent which is capable of being converted to the protective agent by the action of an acid and in excess of that which adheres as a film to such particles in aqueous medium, acidifying the mixture to convert the adherent water-soluble salt to the protective agent, removing the major portion of the aqueous medium and dissolved electrolytes, and then adding to the aggregated particles sufficient of a salt forming compound to form a water-soluble salt of the protective agent, said protective agent being present in the proportion of about 0.1 part to about 9 parts per part of said particles.

7. The process of preparing dispersible particles of water-insoluble organic pigments which comprises mixing a suspension of the particles in aqueous medium with a water-soluble salt of a water-insoluble protective agent which is capable of being converted to the protective agent by the action of an acid and in excess of that which adheres as a film to such particles in aqueous medium, acidifying the mixture to convert the adherent water-soluble salt to the protective agent, removing the major portion of the aqueous medium and dissolved electrolytes, moistening the product thus produced with a solution containing sufficient of a salt-forming compound to form a soluble salt of the adherent protective agent, and then drying, said protective agent being present in the proportion of about 0.1 part to about 9 parts per part of said particles.

8. The process of preparing dispersible particles of water-insoluble organic pigments which comprises mixing a suspension of the particles in aqueous medium with a water-soluble salt of a water-insoluble protective agent which is capable of being converted to the protective agent by the action of an acid and in excess of that which adheres as a film to such particles in aqueous medium, acidifying the mixture to convert the adherent water-soluble salt to the protective agent, removing the major portion of the aqueous medium and dissolved electrolytes, drying the product thus produced, mixing said product with sufficient dry salt-forming compound to convert the protective agent into a water-soluble salt, and then grinding the mixture to a powder, said protective agent being present in the proportion of about 0.1 part to about 9 parts per part of said particles.

9. The process which comprises forming small particles of a water-insoluble solid organic pigment in aqueous alkaline medium in the presence of a water-soluble salt of a water-insoluble protective agent which is capable of being converted to the protective agent by the action of an acid and in excess of that which adheres as films to the particles of solid which are formed, said protective agent being reconvertible into a dispersion agent in quantity in excess of that which the pigment is capable of adsorbing, acidifying the mixture to convert the adherent films of water-soluble salt to films of protective agent, removing the major part of the aqueous medium and dissolved electrolytes, and then adding to the aggregated particles at least sufficient of a salt-forming compound to form a soluble salt of the adherent protective agent, said protective agent being present in the proportion of about 0.1 part to about 9 parts per part of said particles.

10. The process which comprises mixing suspended particles of an organic pigment with sodium rosinate in aqueous suspension, said rosinate being present in excess of that which is necessary to form films on said particles, acidifying the suspension medium until said rosinate is converted to rosin, and removing the suspending medium and dissolved electrolytes until a non-suspended composition is formed, said protective agent being present in the proportion of about 0.1 part to about 9 parts per part of said particles.

11. The process which comprises forming a precipitate of small particles of a water-insoluble organic pigment in suspension in an aqueous alkaline medium in the presence of sodium rosinate, said rosinate being present in excess of that which is necessary to form films on said particles, acidifying the suspension medium until the rosinate is converted to rosin, and removing the suspending medium until a non-suspended composition is formed, said protective agent being present in the proportion of about 0.1 part to about 9 parts per part of said particles.

12. The process of preparing dispersible particles of water-insoluble organic pigments which comprises mixing a suspension of the particles in aqueous medium with sodium rosinate, said rosinate being present in excess of that which is necessary to form films on said particles, acidifying the mixture to convert the adherent water-soluble salt to the protective agent, removing the major portion of the aqueous medium and dissolved electrolytes, and then adding to the aggregated particles sufficient sodium hydroxide to convert the rosin to sodium rosinate, said protective agent being present in the proportion of about 0.1 part to about 9 parts per part of said particles.

13. The process of preparing dispersible particles of water-insoluble organic pigments which comprises mixing a suspension of the particles in aqueous medium with caseing which has been solubilized with an alkaline substance, said solubilized caseing being present in excess of that which is necessary to form films on said particles, acidifying the mixture to convert the adherent water-soluble salt to the protective agent, removing the major portion of the aqueous medium and dissolved electrolytes, and then adding to the aggregated particles at least sufficient of an alkaline substance to convert the casein to its soluble form, said protective agent being present in the proportion of about 0.1 part to about 9 parts per part of said particles.

14. The process which comprises forming an aqueous suspension of particles of a water-insoluble organic pigment in an aqueous suspending medium, adding a water-soluble salt of a water-insoluble protective agent which is capable of being converted to the protective agent by the action of an acid and which is in excess of that which will adhere as films to the particles in aqueous medium, acidifying the medium until the salt of the protective agent is converted to the protective agent, and removing the suspending medium and dissolved electrolytes until a non-suspended composition is formed, the proportion of organic pigment and precipitable protective agent being about 1 part of solids and about 0.1 to about 9 parts of precipitable protective agent.

15. The process which comprises forming a suspension of a pigment obtained by coupling diazotized meta-nitro-para toluidine with acetanilide in an alkaline aqueous medium containing an alkali metal salt of wood rosin, the proportion of said pigment to said salt of wood rosin being about 1 part of pigment and about 0.1 to about 9 parts of said salt and being in excess of that which is necessary to form films on the particles, acidifying the medium until said salt is converted to rosin, removing the major part of the suspending medium and dissolved electrolytes until a non-suspended composition is formed, and mixing the resulting composition with at least sufficient of a salt-forming inorganic compound to form a soluble inorganic salt of the adherent wood rosin.

16. The process which comprises forming a suspension of a pigment obtained by coupling diazotized meta-nitro-para toluidine with acetanilide in an alkaline aqueous medium containing an alkali metal salt of wood rosin, the proportion of said pigment to said salt of wood rosin being about 1 part of pigment and about 1 to about 6 parts of said salt and being in excess of that which is necessary to form films on the particles, acidifying the medium until said salt is converted to rosin, removing the major part of the suspending medium and dissolved electrolytes until a non-suspended composition is formed, and mixing the resulting composition with at least sufficient of a salt-forming inorganic compound to form a soluble inorganic salt of the adherent wood rosin.

JOSEPH W. LANG.

CERTIFICATE OF CORRECTION.

Patent No. 2,365,479.   December 19, 1944.

JOSEPH W. LANG.

It is hereby certified that error appears in the printed specification of the above numbered patent requiring correction as follows: Page 3, second column, line 29, for "sollbilizing" read --solubilizing--; page 5, second column, lines 37 and 39, for "caseing" read --casein--; and that the said Letters Patent should be read with this correction therein that the same may conform to the record of the case in the Patent Office.

Signed and sealed this 27th day of March, A. D. 1945.

Leslie Frazer (Seal)   Acting Commissioner of Patents.

to rosin, removing the major part of the suspending medium and dissolved electrolytes until a non-suspended composition is formed, and mixing the resulting composition with at least sufficient of a salt-forming inorganic compound to form a soluble inorganic salt of the adherent wood rosin.

16. The process which comprises forming a suspension of a pigment obtained by coupling diazotized meta-nitro-para toluidine with acetanilide in an alkaline aqueous medium containing an alkali metal salt of wood rosin, the proportion of said pigment to said salt of wood rosin being about 1 part of pigment and about 1 to about 6 parts of said salt and being in excess of that which is necessary to form films on the particles, acidifying the medium until said salt is converted to rosin, removing the major part of the suspending medium and dissolved electrolytes until a non-suspended composition is formed, and mixing the resulting composition with at least sufficient of a salt-forming inorganic compound to form a soluble inorganic salt of the adherent wood rosin.

JOSEPH W. LANG.

CERTIFICATE OF CORRECTION.

Patent No. 2,365,479. December 19, 1944.

JOSEPH W. LANG.

It is hereby certified that error appears in the printed specification of the above numbered patent requiring correction as follows: Page 3, second column, line 29, for "sollbilizing" read --solubilizing--; page 5, second column, lines 37 and 39, for "caseing" read --casein--; and that the said Letters Patent should be read with this correction therein that the same may conform to the record of the case in the Patent Office.

Signed and sealed this 27th day of March, A. D. 1945.

Leslie Frazer

Acting Commissioner of Patents.

(Seal)